United States Patent [19]

Levecque et al.

[11] 4,137,059

[45] Jan. 30, 1979

[54] METHOD AND APPARATUS FOR MAKING FIBERS FROM ATTENUABLE MATERIALS

[75] Inventors: Marcel Levecque, Birchrunville, Pa.; Jean A. Battigelli; Dominique Plantard, both of Rantigny, France

[73] Assignee: Saint-Gobain Industries, Neuilly-sur-Seine, France

[21] Appl. No.: 834,537

[22] Filed: Sep. 19, 1977

Related U.S. Application Data

[63] Continuation-in-part of Ser. No. 780,589, Mar. 24, 1977, Pat. No. 4,070,173, and Ser. No. 762,789, Jan. 25, 1977, Pat. No. 4,102,662, and Ser. No. 676,755, Apr. 14, 1976, which is a continuation-in-part of Ser. No. 557,282, Mar. 11, 1975, Pat. No. 4,015,964, which is a continuation-in-part of Ser. No. 353,984, Apr. 24, 1973, Pat. No. 3,886,940.

[30] Foreign Application Priority Data

Aug. 23, 1977 [FR] France .............................. 77 25692

[51] Int. Cl.² ............................................. C03B 37/04
[52] U.S. Cl. .............................................. 65/5; 65/16; 264/12; 425/7
[58] Field of Search ............................. 65/2, 5, 16, 12; 264/12; 425/7

[56] References Cited

U.S. PATENT DOCUMENTS

| 2,189,822 | 2/1940 | Thomas et al. | 65/5 |
| 3,732,595 | 5/1973 | Marshall | 65/16 |
| 3,874,886 | 4/1975 | Levecque et al. | 65/16 X |

FOREIGN PATENT DOCUMENTS

| 307637 | 1/1969 | Sweden | 65/5 |
| 283532 | 1/1971 | U.S.S.R. | 65/5 |
| 528270 | 9/1976 | U.S.S.R. | 65/16 |

*Primary Examiner*—Robert L. Lindsay, Jr.
*Attorney, Agent, or Firm*—John T. Synnestvedt; Kenneth P. Synnestvedt

[57] ABSTRACT

The attenuation technique disclosed utilizes high velocity whirling currents or tornadoes formed in a toration zone i.e., a zone of interaction of a principle blast or current of gases and a gaseous carrier jet directed transversely into the blast. The arrangement disclosed employs a novel system for developing a carrier jet having a carrier jet delivery orifice of greater dimension in one plane than in a plane at right angles to said one plane. Preferably a multiplicity of such jet delivery orifices are developed in spaced relation adjacent to an edge of the curved surface of a jet guiding or deflecting element. Streams of attenuable material are introduced into gaseous currents induced by the jets adjacent to the curved surface between the jets, and the streams are carried by the jets into the toration zone.

10 Claims, 7 Drawing Figures

METHOD AND APPARATUS FOR MAKING FIBERS FROM ATTENUABLE MATERIALS

CROSS REFERENCE

The present application is a Continuation-in-Part of our prior applications Ser. No. 780,589, filed Mar. 24, 1977, now U.S. Pat. No. 4,070,173, issued Jan. 24, 1978, Ser. No. 762,789, filed Jan. 25, 1977 now U.S. Pat. No. 4,102,662 and Ser. No. 676,755, filed Apr. 14, 1976, which in turn are Continuations-in-Part of our application Ser. No. 557,282 filed Mar. 11, 1975, now U.S. Pat. No. 4,015,964 issued Apr. 5, 1977, which, in its turn, is a Continuation-in-Part of our application Ser. No. 353,984, filed Apr. 24, 1973, and now issued as U.S. Pat. No. 3,886,940.

BACKGROUND AND OBJECTS

This invention relates to the formation of fibers from attenuable material and while the invention is adapted for use in the formation of fibers from a wide variety of attenuable matterials, it is particularly suited to the attenuation of various thermoplastic materials, especially mineral materials such as glass and similar compositions which are rendered molten by heating. As with the technique of the prior applications above referred to, the present invention may be employed in connection not only with various mineral materials, but also with certain organic materials which are attenuable, such as polystyrene, polypropylene, polycarbonate and polyamides. Since the equipment or apparatus is especially useful in the attenuation of glass and similar thermoplastic materials, the following description refers to the use of glass by way of illustration.

The above identified application Ser. No. 762,789, and also various other prior applications referred to disclose certain techniques for utilizing whirling currents or tornadoes for the attenuation of molten glass. In said application Ser. No. 762,789 the system for developing the secondary or carrier jets which penetrate into the principle current or blast involves the use of a series of jet orifices delivering gaseous jets against the surface of an inclined baffle or deflector, providing for deflection of the jets and for flow of the deflected jets in directions toward and penetrating the blast in order to develop "toration" zones, i.e. zones of interaction in the blast characterized by pairs of tornadoes in which attenuation of the glass streams is effected. In said prior application Ser. No. 762,789 the jets and the deflector are arranged so that the jets tend to spread laterally upon impingement thereof on the deflector surface, and the spacing of the jets is sufficiently close to provide for impingement of the jets upon each other near the free edge of the deflector surface. This impingement and the deflection of the jets results in development of pairs of whirling currents or tornadoes adjacent the edges of each jet, and further results in low pressure zones in each jet just downstream of the edge of the deflector, into which zones ambient gas or air is induced. In said low pressure zones the gas flow is substantially laminar, and the streams of molten glass are introduced into the system in said laminar flow zones, thereby providing stability of feed of the glass streams into the system. The glass streams are then advanced with the flow of each jet toward the zone of interaction produced by penetration of each jet into the blast, with consequent attenuation of the stream in said zones of interaction.

As in said application Ser. No. 762,789, the system of the present invention also provides for development of toration zones by penetration of jets into a blast and for attenuation of streams of molten glass in said zones, but in the system of the present invention the jets are developed in a different manner, and feed of the streams of molten glass is differently oriented with relation to the jets, than in the Ser. No. 762,789 application referred to.

In the system of the present invention, provision is made for generation of a plurality of jets with their axes lying in spaced side-by-side planes, which planes are referred to herein as the median planes of the jets. Perpendicular to the median planes, the axes of the jets initially lie in a common plane which is tangent to a convexly curved surface of a guiding device, so that the jets are subjected to a Coanda effect causing jets to deflect and follow the curvature of the convexly curved surface of the guiding device.

The jets are delivered from orifices which are preferably of greater cross sectional dimension in the common plane in which the jets are initially generated, as compared to the cross sectional dimension perpendicular to said common plane.

With the arrangement of the jets and jet orifices just described, the deflection of the Coanda deflection of the jets results in development of a pair of whirling currents or tornadoes within the flow of each jet, and the direction of turning of these currents and the interspacing between the jets results in induction of ambient gas or air adjacent to the surface of the curved guiding element in the spaces between the jets. This induced flow over the surface of the curved guiding element between the jets represents a substantially laminar flow, and the streams of molten glass are introduced into this laminar flow between adjoining jets.

Feed of the glass streams into the laminar flow zones intermediate the jets in the region of the surface of the curved guiding element increases the stability of feed of the glass streams. In a manner more fully explained hereinafter, each stream of molten glass is then drawn from the zone of laminar flow into the flow of one of the jets and is carried thereby into the zone of interaction with the blast, for attenuation therein. The feed of the glass into the jet system also effects preliminary attenuation of the glass stream, as will also be explained.

Notwithstanding the fact that the glass streams are fed into the influence of the jets in planes intermediate to the median planes of the jets, a high degree of stability of feed is provided because the zones of laminar flow into which the streams are delivered are located on the surface of the curved guiding element, which is a fixed structural part.

DETAILED DESCRIPTION

Figure 1:
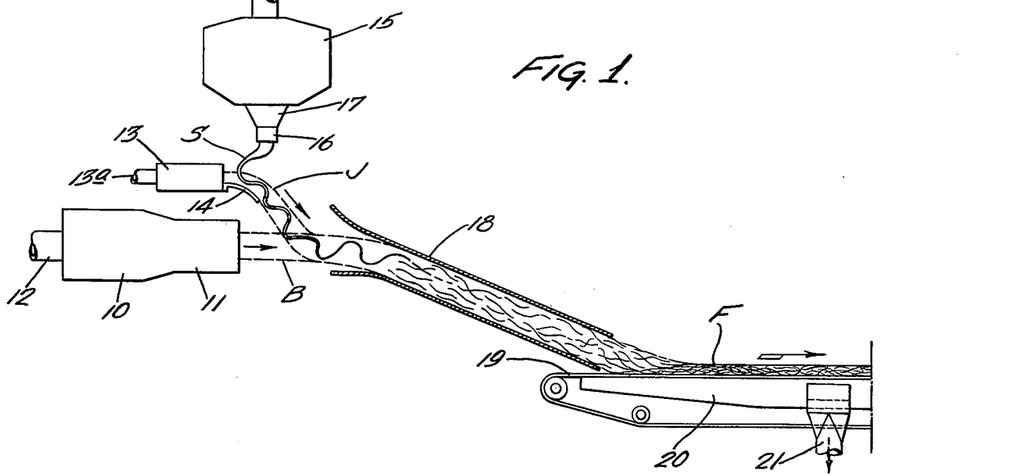
FIG. 1 is a somewhat diagrammatic side elevational view, with parts in section, illustrating the major fiber producing and collecting components of a system according to the present invention.

Referring first to the illustration of FIG. 1, the reference numeral 10 indicates a blast generator, having a discharge device 11 from which the blast B is discharged toward the right as viewed in FIG. 1. The device 10 may be of the burner type, supplied with air and fuel in any desired manner, as by the supply connection 12.

Figure 2:
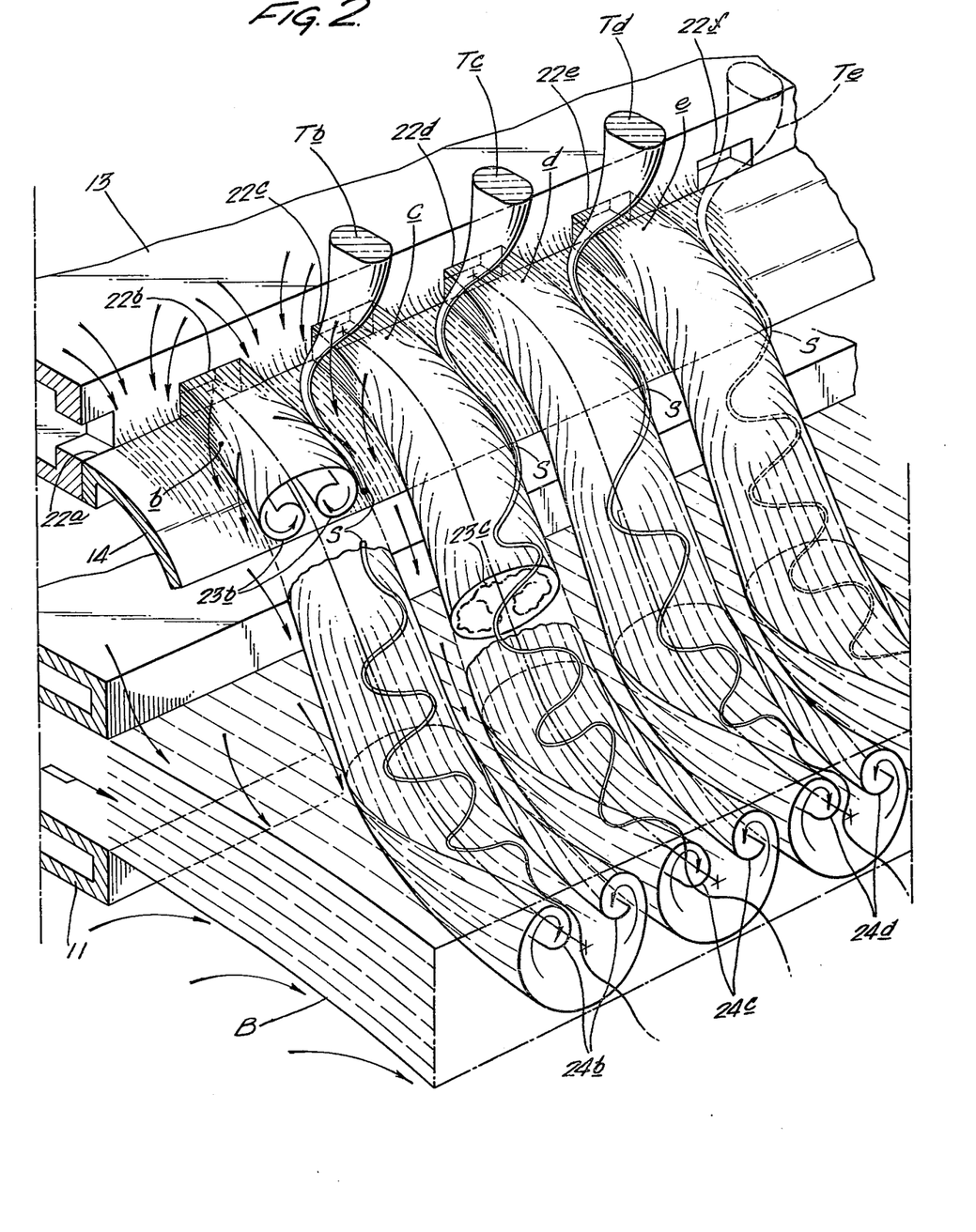
FIG. 2 is an enlarged somewhat diagrammatic perspective view of the major fiber producing components of a system according to the present invention incorporating a plurality of fiberizing centers each arranged in the manner above briefly described, this view illustrating certain parts in section, and having certain portions broken out in order to facilitate illustration and explanation of certain characteristics of the system.

FIG. 2 illustrates jet orifices 22a, 22b, 22c, 22d, 22e and 22f providing for discharge of jets from the manifold 13. The jet orifices, and the jet cores delivered from the orifices are centered in spaced side-by-side median planes, with the jets initially directed in a common plane transverse to the median planes, each jet orifice being of greater cross sectional dimension in said common plane than in a direction transverse to said common plane. In the preferred arrangement of the invention, the jet orifices are substantially rectangular with the two dimensions of the orifices related to each other in the manner more fully brought out hereinafter in connection with FIGS. 5 and 6.

Figure 3:
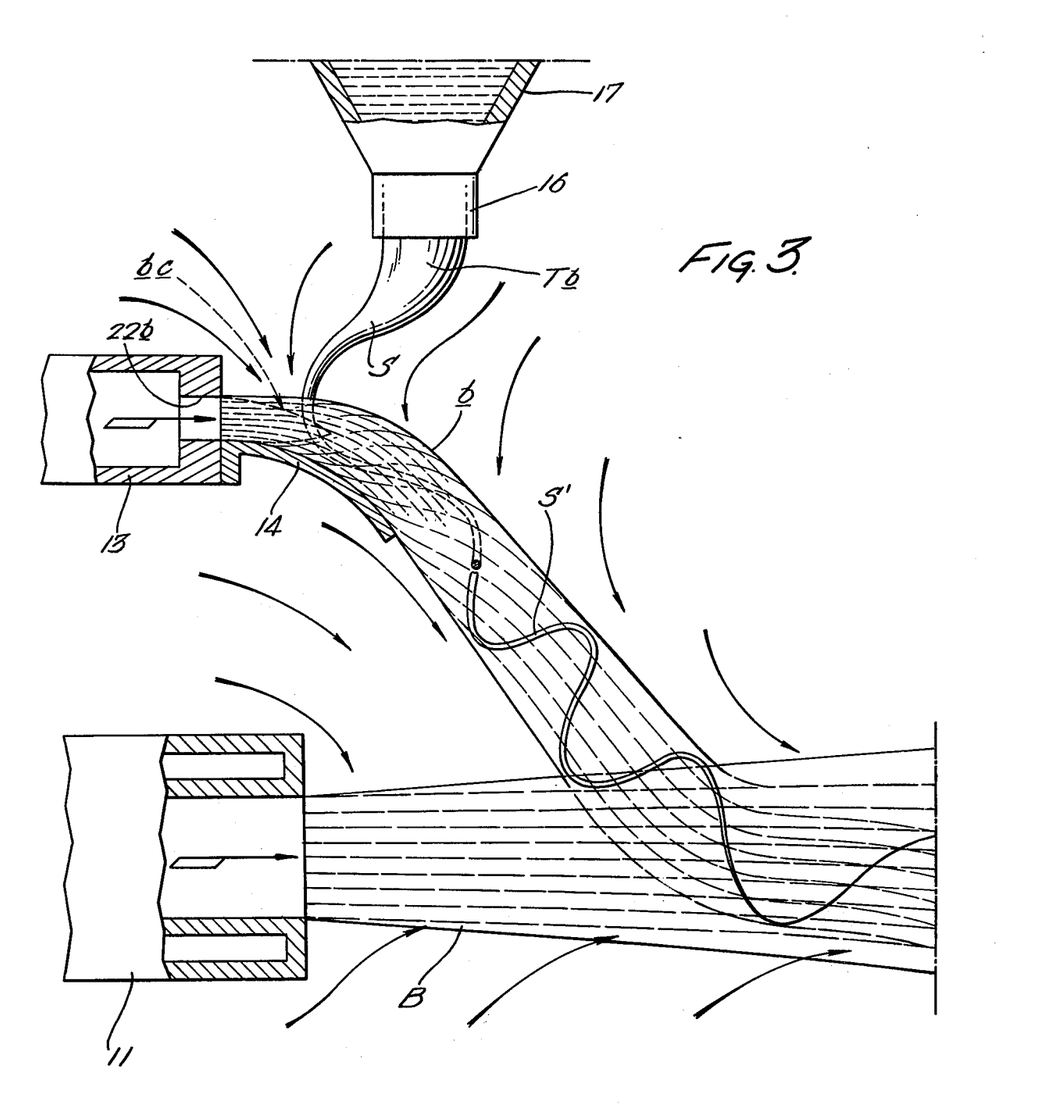
FIG. 3 is an enlarged vertical sectional view taken in the median plane of one of the jets and illustrating the components of one fiberizing center.

As clearly appears in FIG. 1 to 4, the jets b, c, d and e are initially discharged adjacent to the leading edge of a curved Coanda deflecting element 14, with the jet cores closely associated with the curved surface. The jet core bc of the jet b is indicated in FIG. 3. In consequence of the position of delivery of the jets the Coanda effect of the convexly curved surface of the element 14 causes the jets, for instance the jet delivered from orifice 22b, to be deflected in a manner generally following the curvature of the surface of element 14. At the same time the jet flow induces ambient gas or air, this deflection action, coupled with the induced air flow establishing a pair of whirling currents or tornadoes which appear in FIG. 2 at 23b—23b for the jet b in the region where that jet is broken out for purposes of the illustration. The induced air currents are clearly indicated by arrows in FIGS. 2, 3 and 4.

As shown in FIG. 2, the direction of turning of the whirling currents or tornadoes 23b is downwardly at the side edges of jet b. The same is also true with respect to the direction of turning of the tornadoes of jet c, and since the jet orifices are spaced substantially from each other, ambient gas or air is induced between adjoining jets and is caused to flow in a substantial laminar fashion over the convex surface of the guide element 14 in the same general direction as the flow of the jets. Such laminar flow areas are clearly indicated in FIG. 2. The laminar flow of these areas is characterized by relatively low pressure and stability or freedom from turbulence, and the molten glass delivery devices 16 are positioned between the median planes of the jets, preferably in positions so that the streams of molten glass are introduced into the system in the laminar flow zones lying between the jets.

In the feed of molten glass for fiberization in accordance with the foregoing, the delivery devices 16 advantageously provide for development of glass bulbs or tips T from which glass streams S are drawn. In FIG. 2 it will be noted that such tips Tb, Tc, Td and Te are shown in a series lying in planes between the median planes of the jets, tip Tb providing for a stream of glass entering the jet b, tip Tc and Td providing for development of glass streams entering jets c and d. Preferably the glass supply devices 16 and thus the glass tips T, although located in planes between the median planes of the jets, are located closer to one of the adjoining jets than to the other, as will be brought out more fully hereinafter in connection with FIG. 6. This assymetrical location of the glass supply devices is desirable for the purpose of assuring that each glass stream will enter the influence of a given jet.

Figure 4:
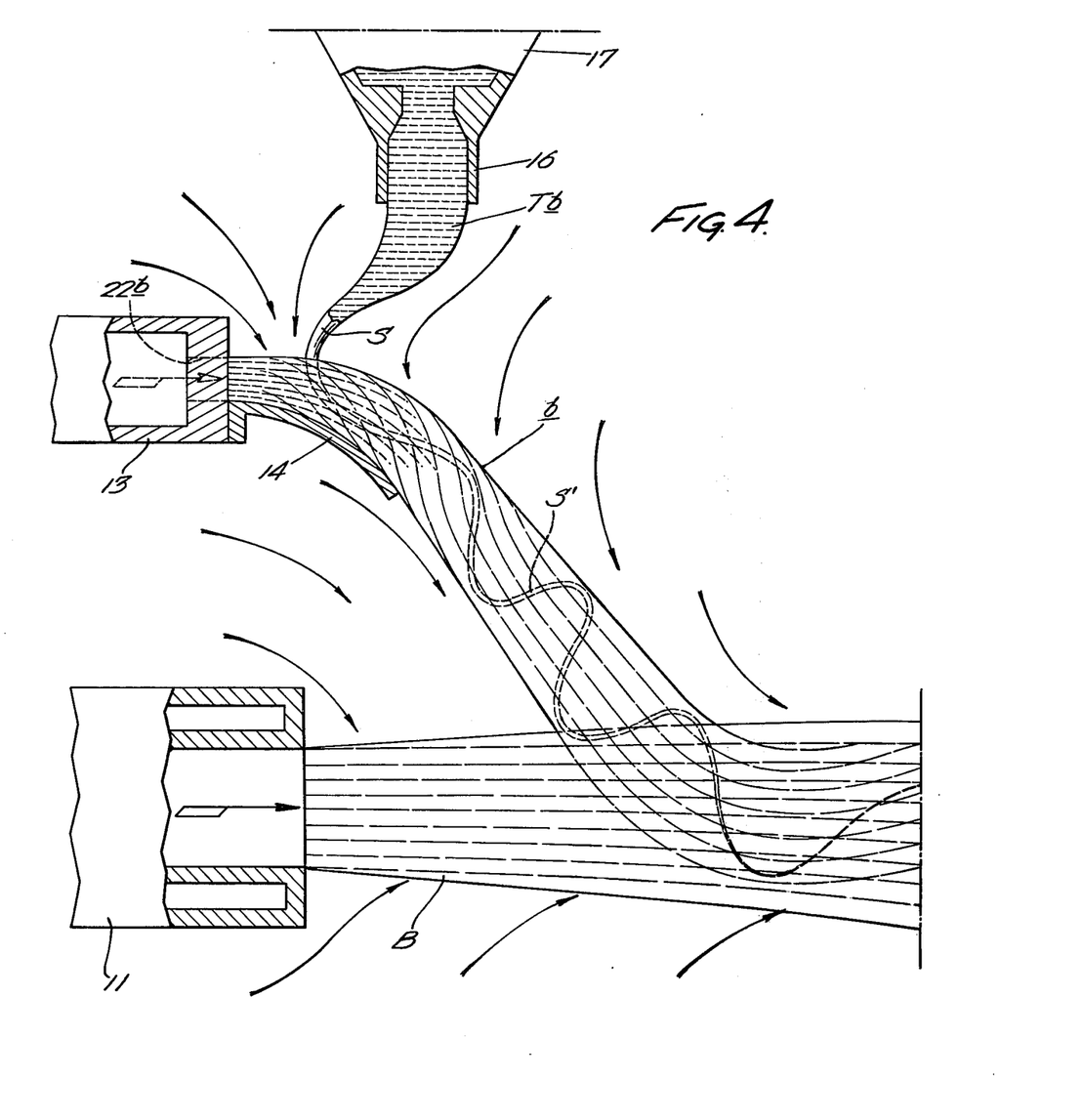
FIG. 4 is a vertical sectional view similar to FIG. 3 but taken in the plane of one of the glass delivery devices, which lies in a plane intermediate the median planes of adjoining jet devices.

FIG. 3 is a view taken in the median plane of the jet orifice 22b and of the jet b delivered from that orifice, and it will be noted that in this view the glass discharge device 16 is shown in elevation as is the glass tip Tb and the stream S which is entering the influence of the jet b. In FIG. 4 the sectional view is taken in the plane of the glass delivery device 16 for the glass tip Tb, and here the delivery device 16 and the glass tip are shown in section.

In FIGS. 2, 3 and 4 the entry of the glass stream S into the jet b is indicated, and in FIG. 4 it will be noted that the lower portion of the glass stream $S^1$ is shown in dotted lines, indicating that this stream stream is in the plane of the jet b and is being delivered thereby into the zone of interaction with the blast B.

In connection with the jet flow of each jet, it will be understood that the whirling currents or tornadoes such as indicated at 23b in FIG. 2 are most pronounced or active in the region adjacent the downstream edge of the guide element 14. The intensity of the whirling currents diminishes as the jets proceed downwardly and this decrease in intensity is indicated by the indefinite lines 23c appearing in the region where the jet c is broken out, about mid way between the downstream edge of the guide element 14 and the region where the jet penetrates the blast B.

Although as the blast B is approached the intensity of the whirling motions of the tornadoes in the jets diminishes and the tornadoes merge with other portions of the jet flow, nevertheless the overall flow of each jet still retains sufficient kinetic energy to penetrate the blast and to produce pairs of tornadoes such as indicated at 24b, 24c and 24d in FIG. 2. Thus, the merged jet flow still has a kinetic energy per unit of volume which is greater than the kinetic energy of the blast. The manner of development of these tornadoes in the zone of interaction is fully explained in various of the applications identified above, and particularly in application Ser. No. 762,789 and also in application Ser. No. 353,984, now U.S. Pat. No. 3,885,940.

The system for developing the jets as described above is enhanced by the employment of jet orifices having a cross sectional dimension in the common plane of the jets, which is greater than in the direction transverse to said common plane, and preferably the jet orifices are rectangular in cross section, because this configuration contributes significantly to the desired development of the pairs of tornadoes in each jet. It is further to be noted that these tornadoes are developed in each jet without requiring impingement of adjoining jets upon each other, and also without the necessity for the presence of any jet confining surfaces positioned at the lateral edges of each jet; and because of these features of the arrangement of the present invention, it becomes possible to position the jet orifices at any desired spacing, provided, of course, that the spacing is sufficient to leave a zone or area intermediate to the jets over the surface of the deflector 14, in which zones the induced ambient gas or air will develop regions of laminar flow into which the glass streams are delivered.

The arrangement of the invention as described above is also characterized by development of the zones of laminar flow on the surface of a fixed or structural part of the system, namely the convexly curved Coanda guide 14 and in view of this both the zones of laminar flow and also the adjoining portions of the jets are highly stable, thereby contributing stability to the introduction of the glass streams into the system.

The kinetic energy of the jet and the blast is determined by several factors, notably the velocity of the jet and the blast and also the temperature thereof. The temperature influences the density of the gases and thus is also a factor which determines the kinetic energy. Although in various of the prior applications above identified, for instance in application Ser. No. 353,984, now U.S. Pat. No. 3,885,940, both the jet and the blast are disclosed as having temperatures well above room temperature, for instance a jet temperature of the order of 800° C. and a blast temperature of the order of 1580° C. For many purposes it is preferred to utilize a jet having much lower temperatures, for instance a temperature approximating ambient or room temperature, as is fully disclosed in our copending application Ser. No. 780,589, above identified.

With the lower jet temperature it becomes practical to employ a commonly available source of air for the jet rather than some burner or heater arrangement, and, in addition, the jet velocity may be lowered, even below that of the blast, and still provide sufficient kinetic energy in the jet to penetrate the blast and develop the interaction zone, including the tornadoes utilized in all of the prior applications above referred to for effecting attenuation of the glass stream in the blast.

It is also to be noted that the jet system together with the feed of the glass into the system may be utilized by itself for purposes of attenuation, but it is preferred to utilize the jet system in combination with the blast, in which event each glass stream is subjected to two stages of attenuation, one of which occurs in the jet system itself, and the second of which occurs in the toration zone or zone of interaction of the jet with the blast.

Figure 5:
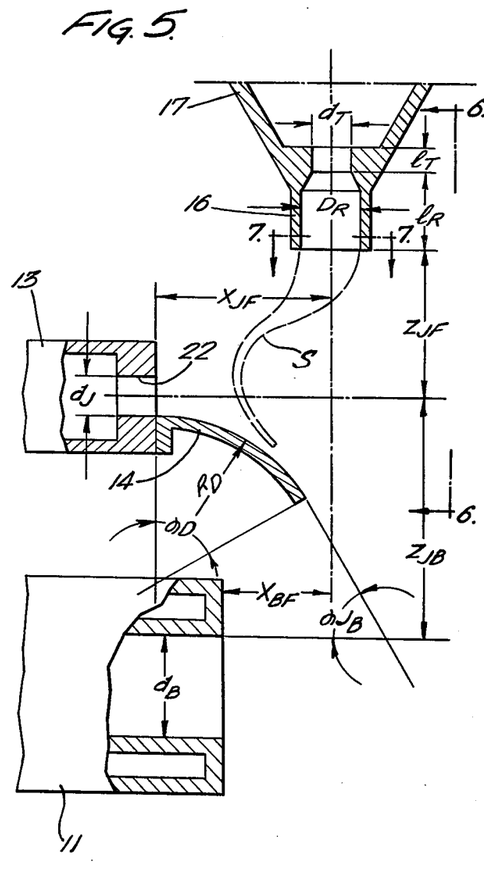
FIG. 5 is a view similar to FIGS. 3 and 4, but particularly illustrating the interrelationship between the various components of a fiberizing center, this view still further indicating certain dimensions and dimensional relationships to be taken into account, in establishing operating conditions in accordance with the preferred practice of the invention.
Figure 6:
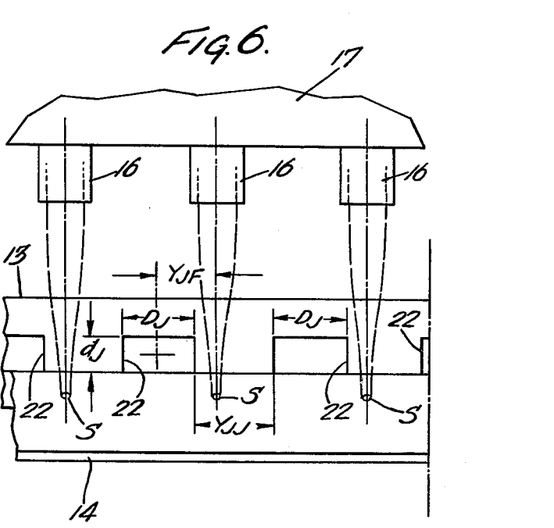
FIG. 6 is a somewhat diagrammatic elevational view taken as indicated by the line 6—6 on FIG. 5 and also indicating certain dimensional relationships involved.
Figure 7:
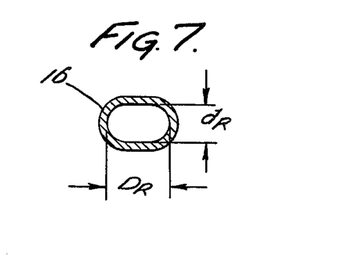
FIG. 7 is a horizontal sectional view taken as indicated by the line 7—7 on FIG. 5.

Attention is now directed to FIGS. 5, 6 and 7 which illustrate somewhat diagrammatically the major components of a fiberizing system according to the present invention, i.e., the means for developing the blast, the means for developing the jet, the convex guide element for deflecting the jet flow and developing the tornadoes in the jet, together with the means for introducing the attenuable material. All of these components are shown in section in FIG. 5 and in FIGS. 5, 6 and 7 symbols or legends have been applied to identify certain dimensions and angles, all of which are referred to in one or another of the tabulations herebelow. The tables give not only appropriate ranges for the dimensions and angles but also indicate typical preferred values.

In considering the symbols and legends, reference is first made to the bushing 17 and the devices 16 for the supply of the attenuable material, in connection with which see Table I just below.

TABLE I

| Symbol | (mm) Preferred Value | Range | |
|---|---|---|---|
| $d_T$ | 2 | 1 | 5 |
| $l_T$ | 1 | 1 | 5 |
| $l_R$ | 5 | 0 | 10 |
| $d_R$ | 2 | 1 | 5 |
| $D_R$ | 5 | 1 | 10 |

With reference to the jet supply and the convexly curved element 14, see the following table:

TABLE II

| Symbol | (mm, degree) Preferred Value | Range | |
|---|---|---|---|
| $d_J$ | 2 | 0.5 | 4 |
| $D_J$ | 3 | 1 | 4 |
| $Y_{JJ}$ | 2 | 1 | 10 |
| $Y_{JF}$ | 2 | $\frac{D_J}{2}$ | $\frac{D_J}{2} + \frac{Y_{JJ}}{2}$ |
| $\frac{R_D}{d_j}$ | 2.5 | 2 | 4 |
| D | 45 | 30 | 90 |
| JB | 45 | 20 | 90 |

The spacing of the glass delivery orifices should be the same as the spacing of the side by side median planes of the jet orifices. As clearly appears in FIG. 6, it is preferred that each glass supply device be positioned to deliver a stream of glass S into the zone of laminar flow overlying curved guide element 14 between adjoining jet but at a location closer to one of the adjoining jets than to the other. This assures that the glass stream will consistently and stably enter the flow of the nearest jet.

With regard to the blast, note the following table:

TABLE III

| Symbol | (mm) Preferred Value | Range |
|---|---|---|
| $l_B$ | 10 | 5 | 20 |

In addition to the foregoing dimensions and angles involved in the major components of the system, certain interrelationships of those components are also to be noted, being given in the table just below.

TABLE IV

| Symbol | (mm) Preferred Value | Range | |
|---|---|---|---|
| $Z_{JF}$ | 5 | 1 | 15 |
| $Z_{JB}$ | 20 | 12 | 30 |
| $X_{BF}$ | −5 | 0 | −20 |
| $X_{JF}$ | 5 | 0 | 10 |

The number of fiberizing centers may run up to as many as 150, but in a typical installation where glass or some similar thermoplastic material is being fiberized, a bushing having 70 delivery devices or orifices is appropriate.

In connection with the operating conditions, it is first pointed out that the conditions of operating the system according to the present invention will vary in accordance with a number of factors, for example in accordance with the characteristics of the material being attenuated.

As above indicated, the system of the present invention is capable of use in the attenuation of a wide range of attenuable materials. In the attenuation of glass or other inorganic thermoplastic materials, the temperature of the bushing or supply means will of course vary according to the particular material being fiberized. The temperature range for materials of this general type may fall between about 1400° and 1800° C. With a typical glass composition, the bushing temperature may approximate 1480° C.

The pull rate may run about 20 to 150 kg/hole per 24 hours, typical values being from about 50 to about 80 kg/hole per 24 hours.

Certain values with respect to the jet and blast are also of significance, as indicated in tables just below in which the following symbols are used.

T = Temperature
p = Pressure
V = Velocity
= Density

TABLE V — JET SUPPLY

| Symbol | Preferred Value | Range | |
|---|---|---|---|
| $p_J$ (bar) | 2.5 | 1 | 50 |
| $T_J$ (° C) | 20 | | 1860 |
| $V_J$ (m/sec) | 30 | 200 | 900 |
| ($V^2$) (bar) | 2.1 | 0.8 | 40 |

TABLE VI — BLAST

| Symbol | Preferred Value | Range | |
|---|---|---|---|
| $p_B$ (m/bar) | 95 | 30 | 250 |
| $T_B$ (° C) | 1450 | 1300 | 1800 |
| $V_B$ (m/s) | 320 | 200 | 550 |
| ($V^2$) (bar) | 0.2 | 0.06 | 0.5 |

The kinetic energy ratio of the jet to the blast may typically be 40 to 1.

We claim:

1. A process for attenuating attenuable material comprising generating a plurality of jets with the jet cores centered in spaced side by side median planes and initially directed in a common plane transverse to the median planes and each jet being of greater cross sectional dimension in said common plane than in a direction transverse to said common plane, deflecting the jets including the flow induced by the jet cores from said common plane by subjecting the jets to the Coanda effect of a convexly curved surface, the jets being spaced from each other and the induced flow of the jets developing zones of laminar flow in regions overlying the Coanda surface between adjoining jets, delivering streams of attenuable material intermediate said median planes into said zones of laminar flow to be carried thereby into the jet flow and effect attenuation of the streams, and generating a gaseous blast of cross section greater than that of the individual deflected jets directed transverse to the deflected jets, the deflected jet flow having higher kinetic energy per unit of volume than the blast and penetrating the blast to develop toration zones into which the streams of attenuable material are carried by the deflected jets.

2. A process as defined in claim 1 in which the streams of attenuable material are delivered to the zones of laminar flow in positions laterally offset from mid planes between said median planes.

3. A process for attenuating attenuable material comprising generating a plurality of jets with the jet cores centered in spaced side by side median planes and initially directed in a common plane transverse to the median planes and each jet being of greater cross sectional dimension in said common plane than in a direction transverse to said common plane, developing a pair of counter rotating tornadoes in edge portions of the jets by subjecting the jets to the deflecting Coanda effect of a convexly curved surface, the jets being downwardly directed and being spaced from each other to provide for development of laminar zones of induced flow over the curved surface between the adjoining tornadoes of the spaced jets, delivering streams of attenuable material intermediate said median planes into said zones of laminar flow to be carried thereby into the jet flow and effect attenuation of the streams, and generating a gaseous blast of cross section greater than that of the individual deflected jets directed transverse to the deflected jets, the deflected jet flow having higher kinetic energy per unit of volume than the blast and penetrating the blast to develop toration zones into which the attenuated streams of attenuable material are introduced for further attenuation.

4. A process as defined in claim 3 in which the streams of attenuable material are delivered to the zones of laminar flow in planes between said median planes but offset from mid planes between said median planes.

5. Apparatus for attenuating attenuable material comprising jet delivery means having a plurality of jet orifices positioned to deliver spaced gaseous jets in a common plane, each jet orifice being of larger cross sectional dimension in said plane than in a direction transverse said plane, a guide element having a convexly curved surface with an upstream edge thereof positioned adjacent to the jets and serving to deflect the path of flow of the jets, means for delivering streams of attenuable material into the influence of gaseous currents induced by the jets in zones intermediate the jets in regions of deflection thereof over the curved surface of the guide element, and means for delivering a gaseous blast of larger cross section than the individual deflected jets, the blast being directed transverse to and intercepting the deflected jets.

6. Apparatus as defined in claim 5 in which each jet orifice is substantially rectangular.

7. Apparatus as defined in claim 5 in which the jet orifices are positioned to deliver the jets with one boundary thereof substantially tangent to the upstream edge portion of said convexly curved surface.

8. Apparatus for attenuating attenuable material comprising a plurality of jet orifices positioned to deliver gaseous jets centered in spaced side by side median planes and initially directed in a common plane transverse to said median planes, each jet orifice being of larger cross sectional dimension in said common plane than in a direction transverse said common plane, a convexly curved Coanda guide element positioned adjacent to the jets and serving to deflect the path of flow of the jets, means for delivering streams of attenuable material into the influence of gaseous currents induced by the jets in zones intermediate the jets in regions of deflection thereof over the curved Coanda guide element, said delivery means being positioned to deliver the attenuable material in planes between said median planes but offset from the mid region between said median planes, and means for delivering a gaseous blast of larger cross section than the individual deflected jets, the blast being directed transverse to and intercepting the deflected jets.

9. Apparatus for attenuating attenuable material comprising a plurality of jet orifices positioned to deliver gaseous jets centered in spaced side by side median planes and initially directed in a common plane transverse to said median planes, each jet orifice being of larger cross sectional dimension in said common plane than in a direction transverse said common plane, a convexly curved Coanda guide element positioned adjacent to the jets and serving to deflect the path of flow of the jets, means for delivering streams of attenuable material into the influence of gaseous currents induced by the jets in zones intermediate the jets in regions of deflection thereof over the curved coanda guide element, said delivery means being positioned to deliver the attenuable material in planes between said median planes but offset from the mid region between said median planes, the convex surface of the guide element having a rectilinear leading edge and a portion of the periphery of each jet orifice being rectilinear and coincident with the upstream edge of said convex surface, and means for delivering a gaseous blast of larger cross section than the individual deflected jets, the blast being directed transverse to and intercepting the deflected jets.

10. A process for attenuating attenuable material comprising delivering a plurality of jets from jet orifices with the jet cores centered in spaced side by side median planes and initially directed in a common plane transverse to the median planes and each jet being of greater cross sectional dimension in said common plane than in a direction transverse to said common plane, developing a pair of counter rotating tornadoes in edge portions of the jets by subjecting the jets to the deflecting Coanda effect of a convexly curved surface, the jets being spaced from each other to provide for development of laminar zones of induced flow over the curved surface between the adjoining tornadoes of the spaced jets, the convex surface of said element having a retilinear leading edge and a portion of the periphery of each jet orifice being rectilinear and coincident with the upstream edge of the convex surface, delivering streams of attenuable material intermediate said median planes into said zones of laminar flow to be carried thereby into the jet flow and effect attenuation of the streams, and generating a gaseous blast of cross section greater than that of the individual deflected jets directed transverse to the deflected jets, the deflected jet flow having higher kinetic energy per unit of volume than the blast and penetrating the blast to develop toration zones into which the attenuated streams of attenuable material are introduced for further attenuation.

* * * * *

UNITED STATES PATENT AND TRADEMARK OFFICE
CERTIFICATE OF CORRECTION

PATENT NO. : 4,137,059
DATED : January 30, 1979
INVENTOR(S) : Marcel Levecque, Jean A. Battigelli and Dominique Plantard It is certified that error appears in the above-identified patent and that said Letters Patent are hereby corrected as shown below:

Column 7, line 24 - "= Density" should read --$\rho$ = Density--;

line 29 - "30" should read --300--;

line 30 - "($v^2$) (bar)" should read --($\rho v^2$) (bar)--;

line 39 - "($v^2$) (bar)" should read --($\rho v^2$) (bar)--.

Signed and Sealed this

Seventh Day of August 1979

[SEAL]

Attest:

*Attesting Officer*

LUTRELLE F. PARKER
*Acting Commissioner of Patents and Trademarks*